United States Patent [19]
Hahn

[11] 3,871,085
[45] Mar. 18, 1975

[54] HIGH SPEED FOOD MEASURING AND/OR FORMING MACHINE

[76] Inventor: Russell J. Hahn, 2333 N. 37th St., Milwaukee, Wis. 53210

[22] Filed: May 14, 1973

[21] Appl. No.: 360,191

[52] U.S. Cl. ................................................. 17/32
[51] Int. Cl. ............................................. A22c 7/00
[58] Field of Search .......... 17/32; 324/483; 425/323, 425/357, 441, 443, 292

[56] References Cited
UNITED STATES PATENTS
2,708,287   5/1955   Long et al.............................. 17/32

*Primary Examiner*—Robert Peshock

[57] ABSTRACT

A food measuring and forming machine is disclosed which can rapidly form and measure food products such as meat and dispense them in a predetermined volume or form. The size of the formed food product can be varied in a rapid manner while the machine is in operation. In a preferred manner when meat products are being formed, a reciprocating cutting knife is positioned adjacent the entrance of a rotating drum member and a scraper element is disposed adjacent the outlet of the rotating drum so as to prevent the accumulation of product on the drum. The drum carries a double acting piston of remotely variable length which is food actuated in that food entering a cavity on one side of the drum dispells formed food from an opposite cavity by the force of movement of the incoming food product. By varying the length of the piston the amount of food product measured or formed is also varied.

12 Claims, 6 Drawing Figures

HIGH SPEED FOOD MEASURING AND/OR FORMING MACHINE

BACKGROUND OF THE INVENTION

This invention relates to an apparatus for measuring and forming food products. More particularly, it relates to an apparatus which can measure and form food products at a rapid rate and while so forming and measuring can be adjusted while in operation to vary the size of the measuring and forming cavity. Additional means are provided to sever any product which does not flow freely into the double acting piston chamber as well as means to provide a tight seal between the rotor and the housing.

Several types of machines for forming and measuring food products are known. Such devices are shown in U.S. Pat. Nos. 2,528,234; 2,708,287 and 3,096,480. In U.S. Pat. No. 2,528,234 a patty molding maching is disclosed which is food operated and employs a double acting piston housed in a rotating drum. In the other two indicated patents, adjustment and actuating means are disclosed for operating pistons in cylinders for forming food products. However, to applicant's knowledge, there is not currently available a food forming and measuring machine which is food actuated in that the food which enters into the machine will also dispel the formed food product and which is so constructed that volume adjustment can be made rapidly and accurately while the apparatus is in operation. Neither is applicant aware of a food forming and measuring machine which has the previously indicated features and in addition has means for effectively preventing carry over of food product into the forming cylinder.

It is an object of the present invention to provide an apparatus for forming and measuring food products wherein the measured or formed product is discharged by the force of the incoming product and which can be incrementally adjusted as to volume while in rapid operation. It is another object of this invention to provide an apparatus for forming and measuring a meat product in a rapid manner which will assure that a determined amount of meat product enters into the forming chamber. It is still another object of this invention to provide apparatus for forming and measuring food products wherein a tight seal is afforded at all times between the rotating dispensing drum and the supporting housing. It is still another object of this invention to provide an apparatus for forming and measuring food products which employs a minimum amount of parts thereby being simple in its construction yet adjustable during rapid operation.

SUMMARY OF THE INVENTION

The foregoing objects are accomplished and the shortcomings of the prior art are overcome by the present apparatus wherein a cylindrical housing has two opposing openings with a drum rotatably mounted in the cylindrical housing and having oppositely spaced cylinders carried by the drum member. The cylinders are open to the outside of the drum member and piston members within the cylinders are interengaged so that movement of one piston head by means of food product entering under force alternately effects movement of the other thereby dispelling the food product in its associated cylinder. To provide for volume adjustment means are provided to incrementally adjust the distance between the piston heads while the drum is in rapid operation. Means are also provided to sever any food product which does not cleanly enter the first cylinder as well as to adjust the drum in sealing engagement with the cylindrical housing.

BRIEF DESCRIPTION OF DRAWINGS

A better understanding of the present process and the apparatus for accomplishing it will be afforded by reference to the drawing wherein.

DESCRIPTION OF THE PREFERRED EMBODIMENT

Figure 4:
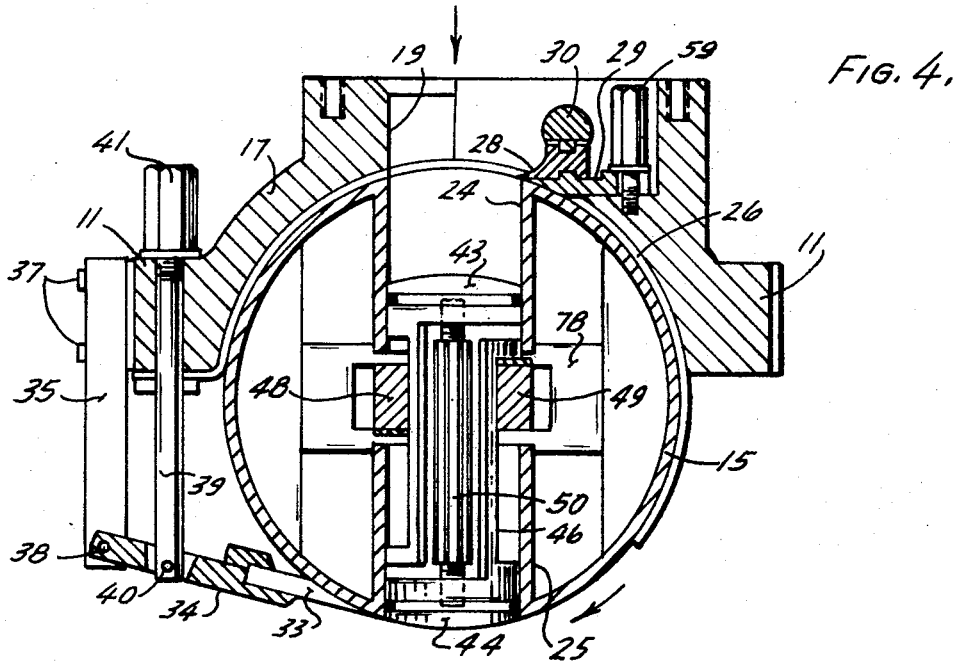
FIG. 4 is a view in vertical section taken along line 4—4 of FIG. 1.

Proceeding to a detailed description of the invention, the machine generally 10 comprises a horizontally extending frame portion 11 supported by four posts 12 with the frame portions secured to by bolts 14. A drum member 15 (FIG. 4) is carried within a semi-circular upper frame 17 and a lower semi-circular frame 18 which together form a cylindrical housing for the rotor member 15. The lower trunnion bearing 18 is secured to horizontal frame portion 11 in an adjustable manner by means of bolts 20 threadably engaging trunnions 22. An inlet conduit 23 is disposed above cap 16 on housing 17 for directing a food product such a ground or diced meat into one of the cylinders 24 in rotor 15 which also carries an opposing cylinder 25. Disposed between drum 15 and upper frame 17 except in the area of opening 19 in frame 17 is seal 26, preferably made from Teflon, which serves as a bearing surface for drum 15. An oscillating serrated type knife 28 is mounted on frame 17 by means of tongue and groove fitting 29 and is actuated by drive bar 30 secured to blade 28. The knife base plate 29 upon which the knife 28 oscillates is adjustably mounted on the housing 17 by means of clamp bolt 59, the shank of which passes through a slot formed in the base plate. The clamp bolt and slot permit precise adjustment of the knife edge with respect to the periphery of drum 15.

Adjustably carried by frame 17 and oppositely positioned adjacent drum 15 is a deflector blade 33 which is held by holder 34. Two supporting posts 35 are secured to horizontal frame portion 11 by bolts 37 with holder 34 pivotally attached by means of pins 38. Adjustment rod 39 is pivotally attached to holder 34 by means of pin 40 with adjustment being made by cap nut 41.

Figure 6:
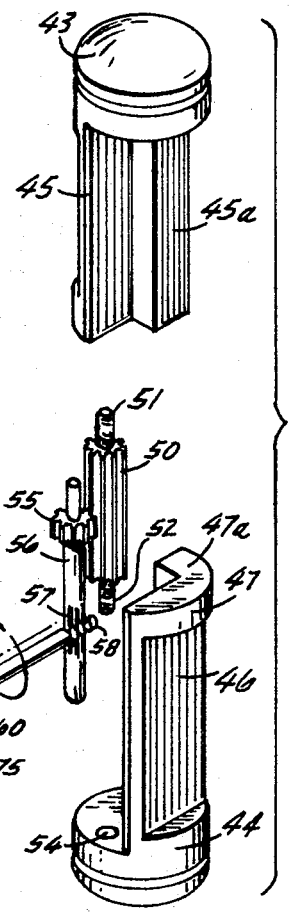
FIG. 6 is a perspective view illustrating the adjustment mechanism for the pistons employed in the apparatus shown in FIGS. 1–4.

Within cylinders 24 and 25 are two opposing pistons 43 and 44 which sealingly engage cylinders 24 and 25. As best seen in FIG. 6, pistons 24 and 44 have a generally L-shaped body portion 45 and 47 so as to interfit in and between cylinders 224 and 25 with projections 45a and 47a in sliding contact during adjustments. Pistons 43 and 44, have an exterior flat wall section such as shown at 46 and are engaged by two parallel bars 48 and 49 for retaining the pistons in drum 15. Pistons 43 and 44 are incrementally moved toward and away from each other in drum 15 and while retained therein by means composed of a splined or toothed pinion member 50 into which oppositely threaded shafts 51 and 52 fastened into pistons 43 and 44 such as shown at 54 in piston 44. Pinion 50 is driven by driving gear 55 secured to rod 56 which also has threads 57 for engagement with worm gear 58. Rod 56 is rotatably secured in block 84 anchored between the pivotally mounted bars 48 and 49.

Figure 2:
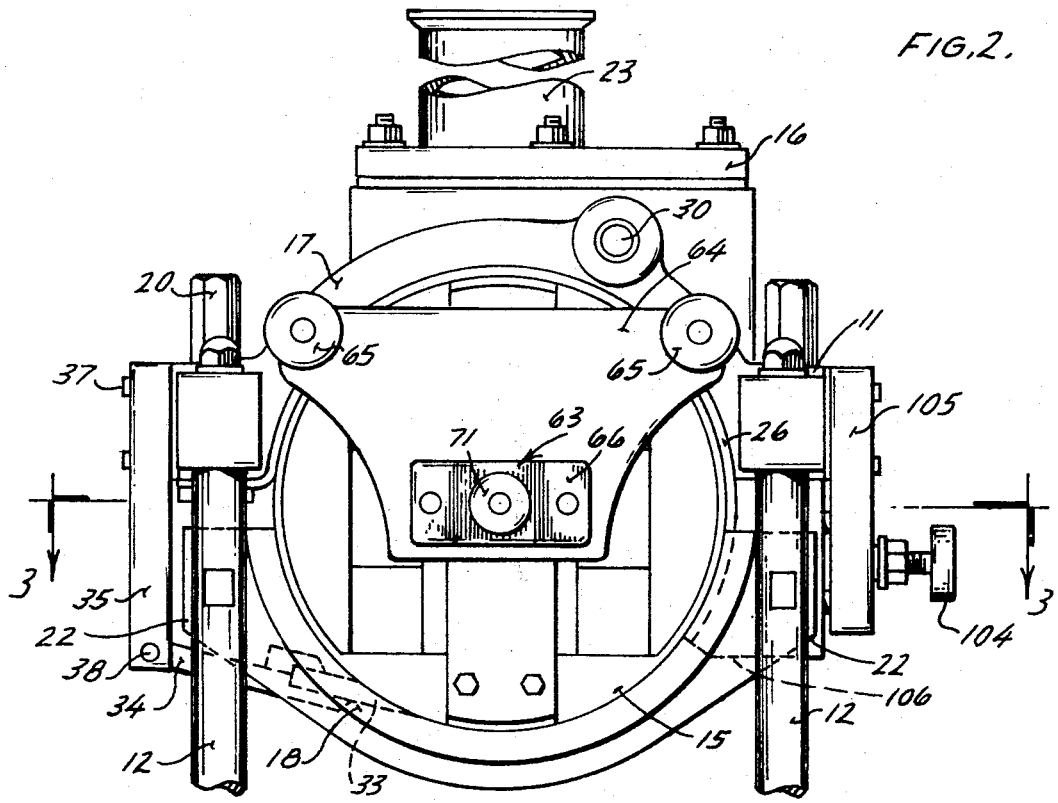
FIG. 2 is a partial view in side elevation taken along line 2—2 of FIG. 1.
Figure 3:
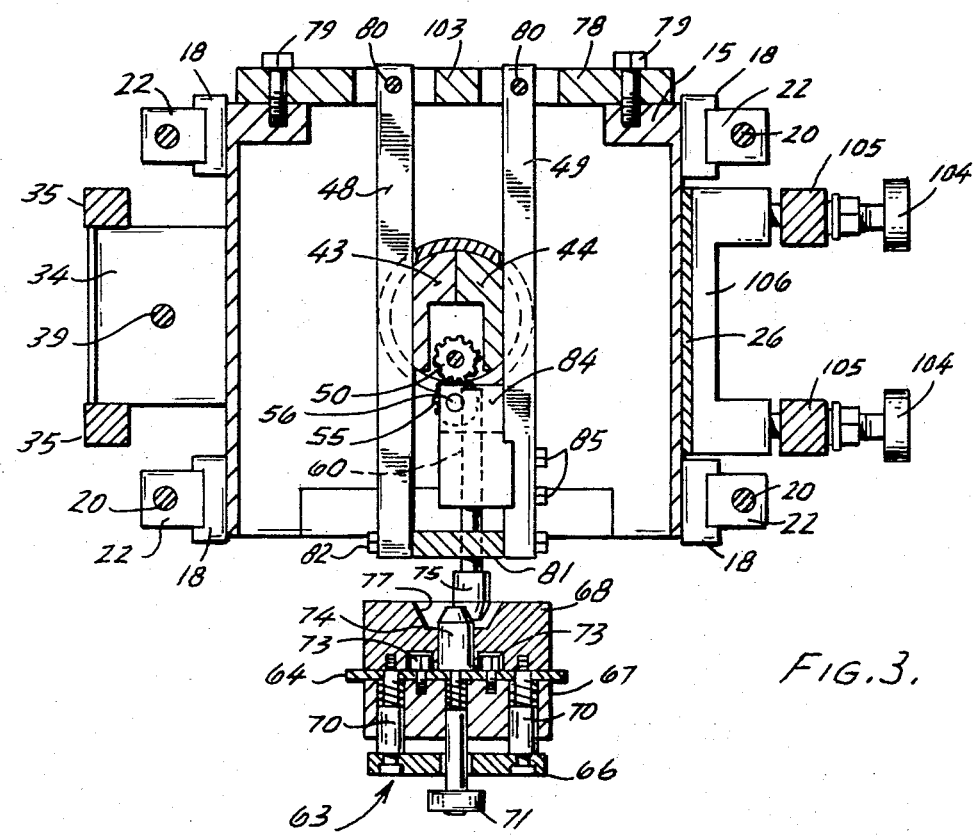
FIG. 3 is a view in horizontal section taken along line 3—3 of FIG. 2.

Worm gear 58 which is formed on rod 60 is actuated in either a clockwise or counterclockwise direction by means of adjustment mechanism generally 63 which as is seen in FIG. 2 is attached to upper frame 17 by means of carrying plate 64 mounted on frame 17 by means of mounting bolts 65. As best seen in FIGS. 3 and 6 adjustment mechanism comprises three plate members 66, 67 and 68 with plate 66 supported by plate 67 by means of two spring loaded pins 70 and connected to plate 68 with plate 67 attached to support plate 64 by means of screws 73. Centrally disposed through plate 66 and 67 is a spring loaded pin member 71 having an end conical portion 74 for engagement with a similar conical member 75 disposed on rod 60. A conical opening 77 is provided in block 68 for purposes as will be described at a later point in the Operation.

Referring particularly to FIG. 3, it will be seen that drum 15 has an end plate member 78 secured thereto by bolts 79 for supporting bars 48 and 49 in a pivotal manner by means of pivots 80. At the opposite end of the bars to that where the pivoting is provided is a block 81 for securing the bars 48 and 49 in a predetermined position with the passage of bolt 82 therethrough. A channel member 84 is secured to rod 49 to serve as a guiding and bearing member for rod 60 with bolts 85 making the necessary attachment.

The driving mechanism for drum 15 as well as knife 28 will now be described. It is shown somewhat schematically in FIG. 5 and comprises the usual motor 86 with two driving sprockets 87 and 88 for driving chains 89 and 90, respectively. These in turn drive driven sprockets 91 and 92 on shaft 93 to which is attached clevis 94. The usual bushings 95 are provided for shaft 93 as well as shaft 96 which is driven by gear 97 on shaft 93 engaging gear 98. A barrel cam 99 is secured to shaft 96 having a cam surface 100 of the undulating type for engagement by cam follower pin 101 on shaft 30. Spring loaded detents 102 are disposed in clevis 94 for holding the clevis in driving engagement with bracket 78 of drum 15 at the central portion indicated at 103. The whole of such driving mechanism is generally mounted as a separate unit to permit easy removal from machine 10 for cleaning purposes.

A conveyor 107 is shown as centrally positioned beneath cylinders 24 and 25 to locate a container 106 for the dispensed food product, although any suitable conveyor means for rapidly moving containers or other receptacles in synchronism with the machine may be used.

Adjustment bolts 104 carried by mounting bars 105 provided for adjusting pressure of shoe 106 against seal 26 on drum 15.

OPERATION

Figure 1:
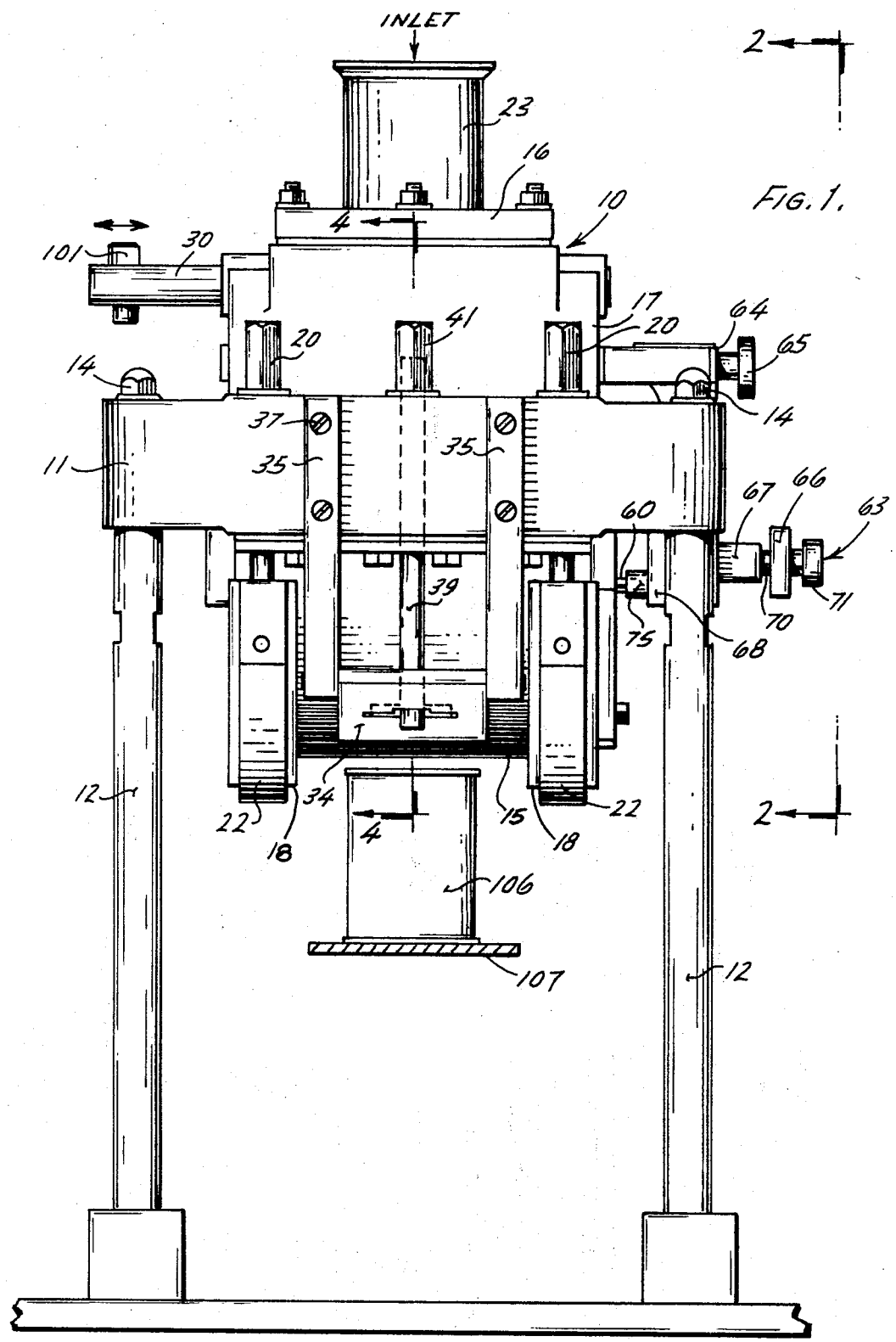
FIG. 1 is a view in side elevation illustrating the apparatus of this invention for measuring and forming food products.
Figure 5:
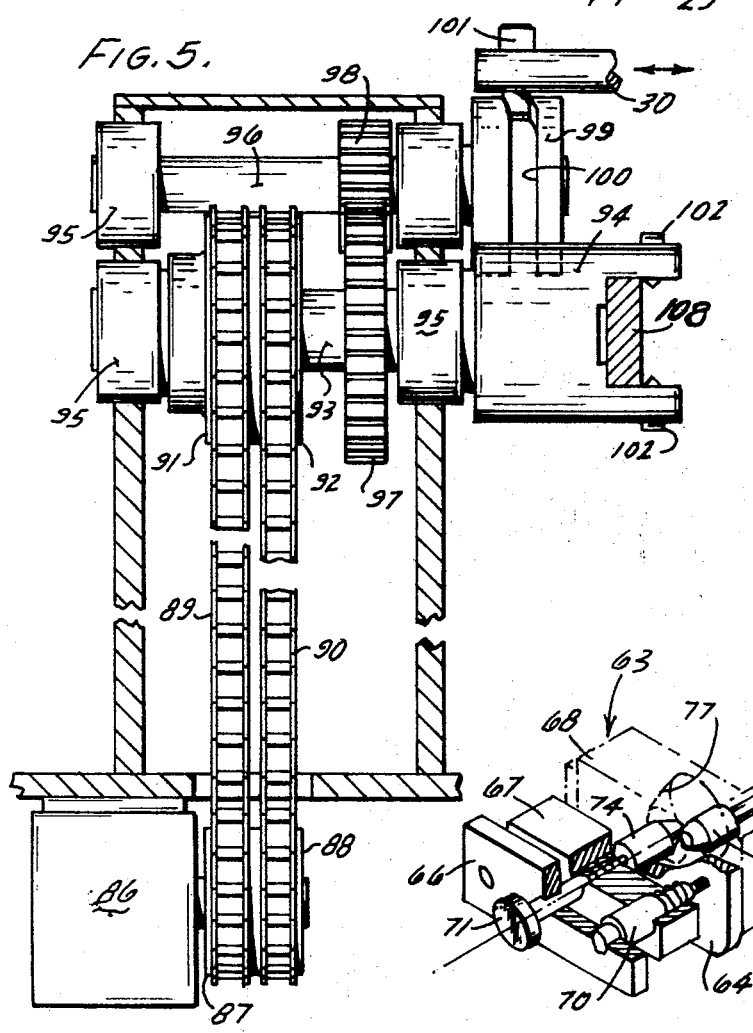
FIG. 5 is a view in vertical section illustrating the drive mechanism for the apparatus illustrated in FIGS. 1–4.

A better understanding of the measuring or forming apparatus 10 of this invention will be had by a description of its operation. The driving mechanism as shown in FIG. 5 will be placed adjacent the left hand side of the forming machine shown in FIG. 1 so that clevis 94 with spring loaded detents 102 will engage drum bracket 78 at 103. Cam follower pin 101 will be placed in cam 99 and in contact with surface 100. A food product such as ground or chopped meat will be caused to enter inlet 23 under pressure by means of a suitable source such as an extruding device or pump.

Motor 86 will be started and through sprockets 87, 88, chains 89 and 90, driving gears 91 and 92 and consequently shaft 93, drum 15 will be caused to rotate by engagement of clevis 94 with bracket 78 on the drum. At the same time, barrel cam 99 will be caused to rotate and to move bar 30 in an oscillating manner so as to cause knife 28 to oscillate at predetermined times such as when the cylinder members approach opening 19 in upper frame 17. The preferred timing for oscillation is approximately 60° of every half rotation of drum 15. This is effected by a 120° dwell between the cam surface 100 and pin 101 which minimizes wear of the cam and follower.

The food product will flow in through inlet 23, through passage 19 and into cylinder 24 where it will contact the head of piston 43. Any tendons or other string forming material will be cut by means of knife 28. Drum 15 will move in a direction of the arrow indicated in FIG. 4, with additional food product continuously flowing downwardly through passage 19 and with cylinder 24 moved out of phase with opening 19 the passage will be stopped until such time as cylinder 25 moves upwardly and in orientation with opening 19. At this stage, additional food product will flow into cylinder 25 moving piston 44 as well as piston 43 downwardly to thereby fill cylinder 25 and thereby empty cylinder 24. Any product tending to adhere to the outside of piston 43 will be scraped free by means of deflector blade 33. This cycle will repeat as long as clevis 94 is rotated. As the food product is ejected from cylinders 24, 25 by incoming product in the opposing cylinder, it will drop into a container 106 supported on conveyor 107.

Should it become desirable to adjust the amount or size of the food product in cylinders 24 and 25 with drum 15 rotating, this can be effected by pushing spring loaded pin 71 inwardly which will cause conical member 74 to engage conical member 75 thereby effecting a rotation of pinion gear 50 by means of worm gear 58 and driving gear 55. Rotation of the pinion 50 about the oppositely threaded pins 51 and 52 fixedly connected to the pistons 43 and 44 will cause the pistons to be moved relatively to each other. This is accomplished by means of the turn-buckle effect produced by having the threads on the pins 51 and 52 disposed in opposite directions and held against rotation by pistons 43 and 44.

To effect movement of the pistons 43 and 44 opposite to that effected by the engagement of conical members 74 and 75, block 66 will be moved in the direction of the block 67 which will thereby cause conical surface 77 in block 68 to ride against conical member 75 and thereby impose an opposite turning of pinion gear 50 and a movement of pistons 43 and 44 oppositely to that when conical member 74 and 75 were engaged. It should be understood that this adjustment mechanism operates with precise accuracy and while the drum and pistons are turning at rapid speeds.

The worm gear adjustment means offers the further advantage of affording a locking means to serve as a brake when not being rotated to adjust the length of the pistons and consequently the volume of the drum cavities. In this manner the setting of the piston length is held from one adjustment ot the next.

Pistons 43 and 44 are held in cylinders 24 and 25 in a non-rotating manner by means of pivotal bars 48 and 49. For ease in cleaning, these pistons are readily removed from the drum merely by removing bolt 82 and pivoting the bars 48 and 49 away from the flat surfaces 46 in the piston so as to release them. Non-rotation of the pistons in the cylinders is essential for effecting piston length adjustment and for holding the curved faces of the pistons in proper relation to the drum periphery.

The scraper or doctor blade 33 is easily adjusted to the outside of drum 15 by merely turning nut 41 in one or another direction which will either pivot holder 34 upwardly or release its tension which is effected by bar 39 pivotally attached to holder 34 with holder 34 pivotally attached to supporting posts 35. A seal 26 is secured between drum 15 and the internal surface of upper frame 17. This seal is held at a predetermined tension by means of bolts 20 which can cause trunnions 22 to move either upwardly or downwardly and thereby effect an upward or downward movement of lower trunnion bearing 18. Further sealing is afforded by shoe 106 forcing seal 26 against drum 15 by means of adjustment bolts 104 which pass through mounting plate 105 to thereby engage shoe 106.

Components such as cylinder walls 24 and 25, pistons 43 and 44, as well as knife 28 and deflector 33 are composed of stainless steel or of other suitable non-corrosive metal. All other components are also made from suitable non-corrosive materials.

While knife 28 and deflector blade 33 are described in conjunction with the forming and/or measuring machine 10 it should be understood that these components could be eliminated if desired. Similarly, although not recommended, the adjustment device afforded by shoe 106 for adjusting the tension of seal 26 against the drum 15 can also be eliminated.

It will thus be seen that through the present invention there is now provided a food product measuring and forming machine which will operate at high rates of speed and will do so by means of the force of incoming food product to eject the product at the opposite position of the drum. Fast and incremental adjustment to either a larger or smaller size can be made with the machine in operation by the unique adjustment mechanism associated with the forming apparatus. The clean up of the drum assembly is also facilitated by a unique means for holding the piston in the cylinder. Efficient operation is also afforded for any type of food product by means of the associated cutting knife.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. An apparatus for measuring and forming food products comprising a cylindrical housing, a drum member rotatably disposed in said cylindrical housing, oppositely spaced cylinders carried by said drum member and opening to the outside of said drum member, piston members including two piston heads slidably engaging said cylinders and interengaged so that movement of one piston head effects a corresponding movement of the other and in the same direction, means to incrementally adjust the distance between said piston heads and means to rotate said drum member whereby a food product introduced under force into one cylinder in said drum in one position ejects similarly introduced food product from the opposite cylinder as the drum rotates and adjustment of the amount of the food product introduced may be readily varied.

2. The apparatus for measuring or forming food products as defined in claim 1 wherein said means to incrementally adjust the distance between said piston heads is a gear means constructed and arranged to increase or decrease the distance between the piston heads.

3. The apparatus for measuring or forming food products as defined in claim 2 wherein said gear means includes a rotatable shaft with a conical engaging portion and further includes a dual conical head member slidably disposed for engaging said conical member on said shaft so as to effect clockwise and alternatively counterclockwise movement of said shaft while said drum member is in operation.

4. The apparatus for measuring or forming food products as defined in claim 1 wherein said apparatus is specially adapted for forming a meat ball or similar product and further includes a cutting knife disposed adjacent to said openings in said cylindrical housing for severing sinews or fibers in the food product.

5. The apparatus for measuring or forming food products as defined in claim 4 further including means to oscillate said knife in a momentary manner.

6. The apparatus for measuring or forming food products as defined in claim 5 wherein said means to oscillate said knife functions only when a portion of said rotor containing said opening is adjacent said knife.

7. The apparatus for measuring or forming food products as defined in claim 5 wherein said knife is of a serrated type.

8. The apparatus for measuring or forming food products as defined in claim 7 further including a deflector blade positioned adjacent the opening in said drum opposite to that engaged by said knife and with the leading edge of said deflector blade disposed oppositely to that of the edge of said knife.

9. The apparatus for measuring or forming food products as defined in claim 8 further including means to adjust the tension of said deflector blade against the drum housing.

10. The apparatus for measuring or forming food products as defined in claim 1 further including a resilient seal disposed between the cylindrical housing and the drum at the top of the cylindrical housing and the drum except in the areas of said openings, said seal also serving as a bearing member.

11. The apparatus for measuring or forming food products as defined in claim 10 further including means to adjust the tension between the drum and the seal.

12. The apparatus for measuring or forming food products as defined in claim 11 wherein said means to adjust the tension between the drum and the seal includes bolt members disposed on the frame for movement of the housing in relation to the drum.

* * * * *